UNITED STATES PATENT OFFICE.

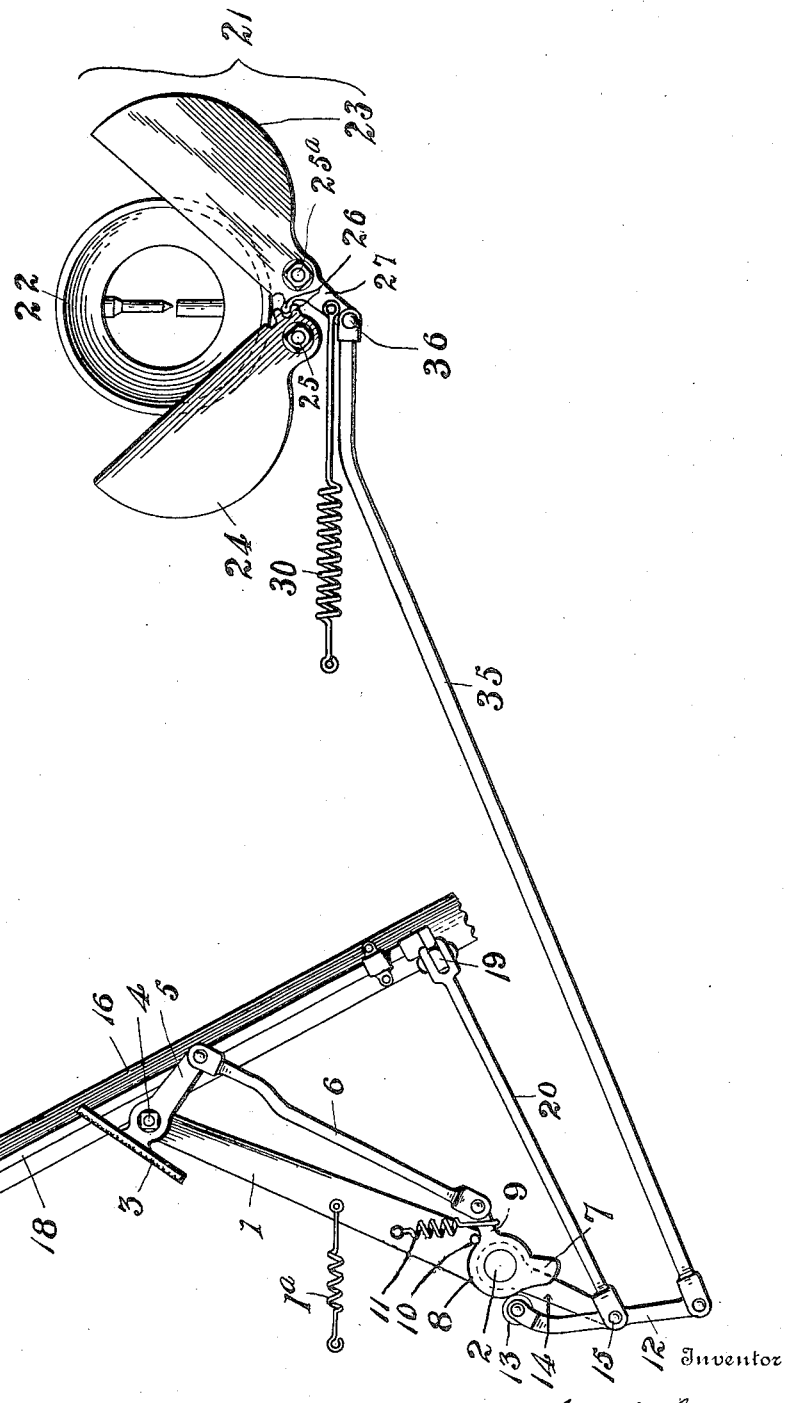

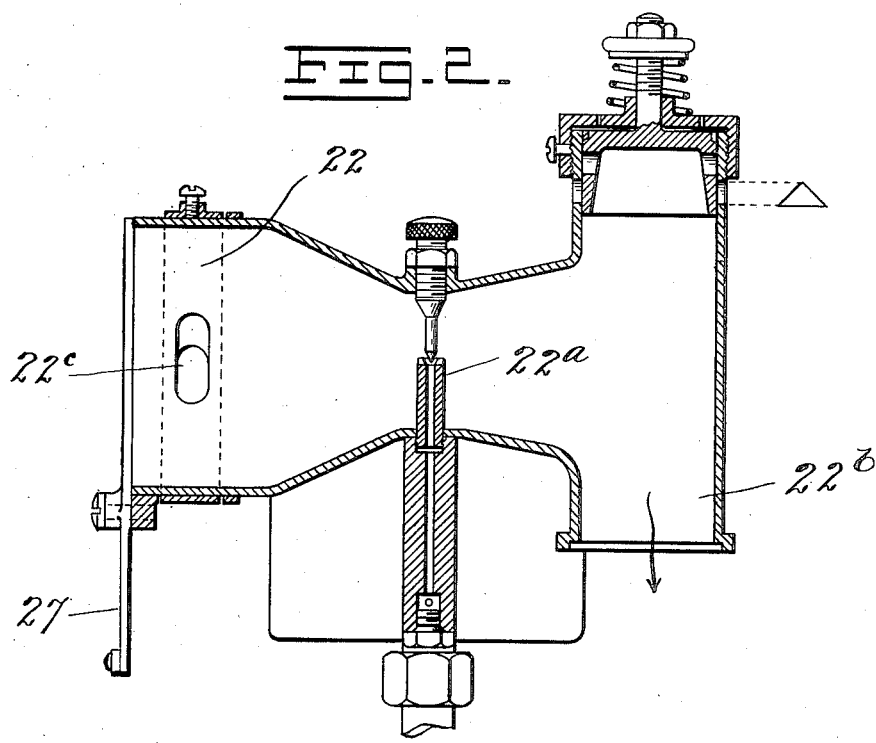
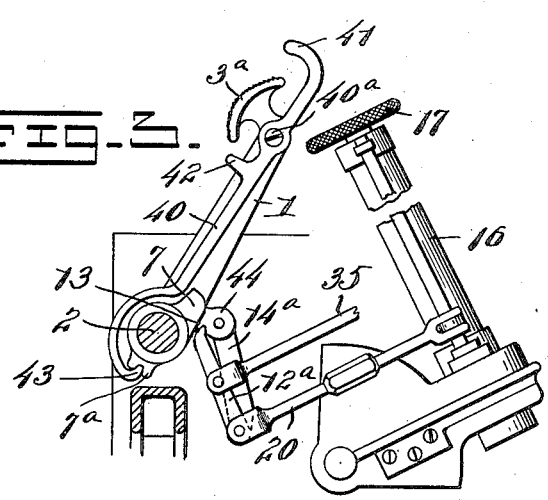

DEMPSTER M. SMITH, OF WASHINGTON, DISTRICT OF COLUMBIA.

CONTROLLING SYSTEM FOR MOTOR-VEHICLES.

1,115,120.  Specification of Letters Patent. Patented Oct. 27, 1914.

Original application filed April 24, 1905, Serial No. 257,216. Divided and this application filed December 11, 1906, Serial No. 347,364. Renewed March 12, 1910. Serial No. 549,006.

*To all whom it may concern:*

Be it known that I, DEMPSTER M. SMITH, a citizen of the United States, and resident of Washington, in the District of Columbia, have invented a new and useful Controlling System for Motor-Vehicles, of which the following is a specification.

This application is a division of my prior application Serial No. 257,216, filed April 24, 1905, for improvements in motor vehicles.

The present application relates especially to mechanism for governing and controlling the speed of the motor of a motor vehicle, although it may be used in connection with other motors in certain cases.

The characteristics and advantages of my invention are hereafter particularly described in connection with a detailed description of the accompanying drawing which illustrates an exemplifying structure in which the invention is embodied and in which, Figure 1 is a diagrammatic view of mechanism embodying my invention; Fig. 2, a central sectional view of a representative motor speed-controlling element; and Fig. 3, a partial diagrammatic view of a modified form of my invention.

Referring first to Fig. 1, 1 is a pedal lever mounted on a shaft 2; the lever may be revoluble in relation to the shaft or fixed to it, and the shaft mounted in suitable bearings; 1$^a$ is a spring, which typifies means for returning lever 1 toward the left after it has been moved toward the right by the operator; 3 is a pedal pivotally mounted at 4 on lever 1; 5 an extension of pedal 3; 6 a link connected to extension 5; 7 a cam having a hub 8 loosely mounted on shaft 2; 9 an arm of cam 7 connected to link 6; 10 a stop on the pedal lever 1; 11 a spring urging the arm 9 against the stop 10.

12 is a lever which I call a differential member or lever bearing at one end an antifriction roller 13 which serves as a cam follower engaging cam 7; any suitable means may be employed for retaining this follower in engagement with the cam, such as spring 30 applied to arm 27 of shutter 23; the exact location of the spring is, however, immaterial; 14 a link loosely mounted on shaft 2 and connected pivotally to lever 12 at point 15, serving simply to support the lever; 16 is the steering column; 17 a lever which constitutes a hand-controlling device thereon; 18 is a rod connected to lever 17; 19 an arm on the lower end of the rod 18; 20 a link connecting arm 19 with the differential lever 12 at 15.

Pedal lever 1, or pedal 3, depending on the manner of using the mechanism as will hereafter appear, constitutes a foot regulating device for affecting the speed of the motor, and hand-lever 17 constitutes a hand regulating device for affecting the motor speed.

21 is the general designation of a representative motor speed controlling device; in the present instance this is a carbureter or throttle element which serves to regulate the quantity or quality of explosive mixture admitted to the engine; instead of the particular controlling device described, however, any other which serves to affect the motor speed might be substituted.

22 is a tube admitting air to the carbureter and leading past the fuel nozzle 22$^a$ (see Fig. 2). Tube 22 constitutes a mixing chamber where gasolene or other fuel is mixed with air in suitable proportions and this gas passes to the cylinders through a pipe connected to the outlet 22$^b$.

A fixed opening 22$^c$ is provided between the mouth of tube 22 and the gasolene jet so as to permit the ordinary operation of the motor.

23, 24 are shutters pivoted at 25, 25$^a$ to a fixed part of the carbureter and connected to move in unison by cogs 26; these shutters serve to regulate the admission of additional air to the carbureter and so to vary the vacuum in tube 22 and thus to regulate the amount of fuel drawn from the gasolene nozzle. By this arrangement closing the shutters 23 and 24, increases the speed of the motor by raising the vacuum in tube 22 and conversely opening the shutters decreases the motor speed by reducing the vacuum. The object of using a double shutter is simply to centralize the blast of air entering the carbureter and if this feature is found unnecessary a single shutter may be used.

Shutters 23, 24, or the single shutter or other equivalent which may be substituted therefor, is only representative of any movable member which may serve to regulate the speed of the motor.

27 is an arm on one of the shutters 23, 24, and 35 is a link connecting the lower end of differential lever 12 and arm 27.

Pedal lever 1 is conveniently employed to control certain functions of a motor vehicle other than the motor speed. Since cam 7 is normally revoluble through the same angle as lever 1, however, movement of said lever will affect the motor speed after the slant surface of the cam comes in contact with cam follower 13, in a manner which will be understood hereafter. For the present it may be assumed that lever 1 is stationary at such an angle that the slant surface of the cam is near the cam follower. The ball of the operator's foot rests on pedal 3. The motor being in motion, to increase its speed lever 17 which is convenient to the operator's hand is moved forward. This carries arm 19 and link 20 to the right and since cam follower 13 is in contact with the concentric surface of the cam the lower end of differential lever 12 is moved to the right, and this movement is communicated through link 35 to the motor-speed controlling element. Opposite movement of the hand-regulating device serves to decrease the speed of the motor in an obvious manner.

It is often desirable to vary the speed of the motor by movement of the foot when for example, the hands are occupied in steering or manipulating other controlling members than those forming the subject of my invention, or when it is not desired to disturb the hand-regulating lever 17. In my invention this is done by the operator extending the toes of the foot resting upon pedal 3. This rotates the pedal in a clockwise direction as viewed in Fig. 1, moving arm 5 downward and through link 6 rotates cam 7 in the same direction. The slant face of the cam thereupon comes in contact with the cam follower 13 and the upper end of differential lever 12 is moved to the left; the lever now turns on point 15 as a fulcrum and the lower end of the lever moves to the right, carrying link 35, and arm 27 in the same direction, further closing shutters 23, 24 and increasing the speed of the motor. Upon relaxing pressure on the upper part of pedal 3 the pedal and other parts controlled by it will return under influence of spring 11 to their normal position indicated by the position of the hand controlling element 17.

It has been assumed that pedal lever 1 remains stationary. In controlling other functions of the machine, however, this lever is sometimes moved forward and such movement carries with it cam 7 so as to give an acceleration of the motor corresponding to the angular position of the lever. At the same time the pedal can be acted on by the foot of the operator so as to increase the speed of the motor beyond that indicated by the momentary position of the lever.

If desired, spring 11 is to be dispensed with and the connection of pedal 3 to lever 1 at the point 4 is made rather tight so that the pedal will remain in the position in which it is placed by the operator. This enables the foot to be removed from the pedal without disturbing the speed of the motor and enables the operator to make a more permanent adjustment of the motor speed by manipulation of the pedal.

In Fig. 3 the modification is shown in which pedal $3^a$ is rigid with pedal lever 1 and cam 7 is operated by a separate lever 40 pivoted to the pedal lever at $40^a$. This lever 40 is curved near its lower end and engages the cam by means of a finger 43 engaging a slot $7^a$ in the cam. The differential lever $12^a$ is supported by a link $14^a$ connected to the lever at its lower end and to a fixed support 44 at its upper end. Link 35 is to be connected at its forward end to motor controlling element 21, as in Fig. 1. Other details of Fig. 3 and its method of operation it is thought will be obvious from the foregoing description.

Pedal lever 1 may be connected through shaft 2, or otherwise, with a clutch which serves to connect or disconnect the motor with the driving wheels of the vehicle, and in this case when pressure is exerted upon the pedal lever the clutch may be engaged or disengaged, and at the same time by tilting the pedal 3 the motor-speed may be increased or decreased, as desired. It will be noted that shutters 23, 24, vary the amount of gas admitted to the engine, and, therefore, they typify a throttling device for controlling the engine speed and in turn controlled by pedal 3.

Having described my invention, what I claim is:

1. Controlling mechanism for motor vehicles, comprising a motor-speed controlling element, a hand regulating device, a foot regulating device, and differential mechanism connecting said devices with said element and serving to maintain the element under all operative conditions in a position dependent upon the relative positions of the devices.

2. Controlling mechanism for motor vehicles, comprising a motor-speed controlling element, a hand regulating device, a foot regulating device, and mechanism intermediate said devices and said element for varying its position by movement of either of said devices while the other remains stationary in any of its operative positions.

3. Controlling mechanism for motor vehicles, comprising a motor-speed controlling element, a hand regulating device, a foot regulating device, and differential mechanism positively connecting said device with said element serving to give an immediate and definite movement to said element upon and movement of either of said devices irrespective of the position of the other device.

4. The combination of a movable motor-controlling element, a hand-regulating device, a foot-regulating device, and a differential member so connected to said element that the position of the element is dependent under all conditions upon the relative positions of said devices.

5. Controlling mechanism for motor vehicles, comprising a motor-speed controlling element, a hand regulating device, a foot regulating device, and mechanism intermediate said devices and said element for varying its position by movement of either of said devices while the other remains stationary in any of its positions.

6. The combination of a motor-speed controlling element, a hand regulating device, a foot regulating device, a differential member whose position is dependent under all conditions upon the relative positions of the devices, and a positive connection between the member and the element.

7. The combination of a motor-speed controlling element, a hand and a foot regulating device, and mechanism intermediate the devices and the element whereby the element may be moved to approximately the extreme low or high speed position by movement of either of the devices irrespective of the position of the other.

8. The combination of a motor-speed controlling element, a hand and a foot regulating device, and means acting to maintain said element at all times in a position dependent upon the relative positions of said devices.

9. In a motor vehicle the combination of a hand regulating device, a foot regulating device, and means acting upon movement of either device, irrespective of the position of the other, to vary the speed of the motor.

10. In a motor-vehicle having an internal-combustion motor, the combination of a vaporizer, a movable vaporizing-element, a hand regulating device, a foot regulating device, and means serving to maintain said element in a position depending upon the relative positions of said devices.

11. In a motor-vehicle having an internal-combustion motor, the combination of a vaporizer, a movable vaporizer-element, a hand regulating device, a foot regulating device, and differential mechanism serving to maintain said element in a position depending upon the relative positions of said devices.

12. In a motor vehicle, the combination of a motor-speed controlling element, a pedal, a hand regulating-lever, a cam moving with the pedal, a differential member acted upon by the cam at one point and by the lever at another point, and a link connecting a third point of the differential member with the element.

13. In a motor vehicle, the combination of a motor-speed controlling element, a pedal, a hand regulating-lever, a cam connected to move with the pedal, a differential member having a cam-following engaging the cam, a link connecting the lever and the member, and a connection between the member and the element.

14. In a motor vehicle, the combination of a motor-speed controlling element, a pedal lever, a pedal pivoted thereon, a cam rotatable about the pivotal axis of the lever, a stop on the lever, a spring urging the cam to rotate until checked by the stop, a link connecting the cam and pedal, a differential lever having a cam-follower acted on by the cam, a hand regulating device, a connection between the device and the differential lever, a motor-speed controlling element, and a connection between the element and the differential lever.

15. The combination of a motor-speed-controlling element, two regulating devices adapted to be arbitrarily acted upon by the operator, and means intermediate the devices and the element serving to maintain the element in a position always dependent upon the relative positions of the devices.

16. The combination of a motor-speed-controlling element, two regulating devices adapted to be arbitrarily acted upon by the operator and means intermediate the devices and the element serving to move the element upon movement of either of the devices, said means being constructed and arranged so that a certain movement of either device through any part of its range of motion exerts substantially the same effect upon the element.

17. The combination of a motor-speed-controlling element, two regulating devices adapted to be arbitrarily acted upon by the operator, and means intermediate the devices and the element serving to maintain the element in a position dependent upon the relative positions of the devices, the said means being constructed and arranged so that a stated movement of either device in any part of its permitted range of movement exerts substantially the same effect upon the element.

18. In a motor vehicle, the combination of a clutch controlling member, throttle controlling means, and a common actuating device movably connected to said member and connected to said throttle controlling means and operative to control said clutch and throttle individually or simultaneously at the will of the operator.

19. In a motor vehicle, the combination of a clutch controlling pedal, throttle controlling means, and a common operating member movably mounted on said pedal and connected to the throttle controlling means and operative to actuate either said pedal or the throttle controlling means at the will of the operator.

20. In a motor vehicle, the combination of a clutch controlling pedal, throttle controlling means, and a member permanently but movably connected to the pedal and said means and operative to adjust the throttle controlling means individually or simultaneously with respect to the operation of the clutch pedal.

21. In a motor vehicle, the combination of a clutch pedal, throttle controlling means, and a combined throttle and pedal operating foot plate movably mounted on said pedal and operatively connected to said throttle controlling means.

22. In a motor vehicle, the combination of a motor for driving the same, a clutch driven by the motor and controlling the driving of the vehicle, a throttle controlling the operation of the motor, a clutch controlling member, and a device movably mounted on the clutch controlling member and connected to said throttle, said device constituting common operating means for the clutch controlling member and the throttle and being operative to control the same individually or simultaneously.

In testimony whereof I have affixed my signature in the presence of two witnesses.

DEMPSTER M. SMITH.

Witnesses:
N. E. COSTELLO,
E. H. PARKINS.